Figure 2:
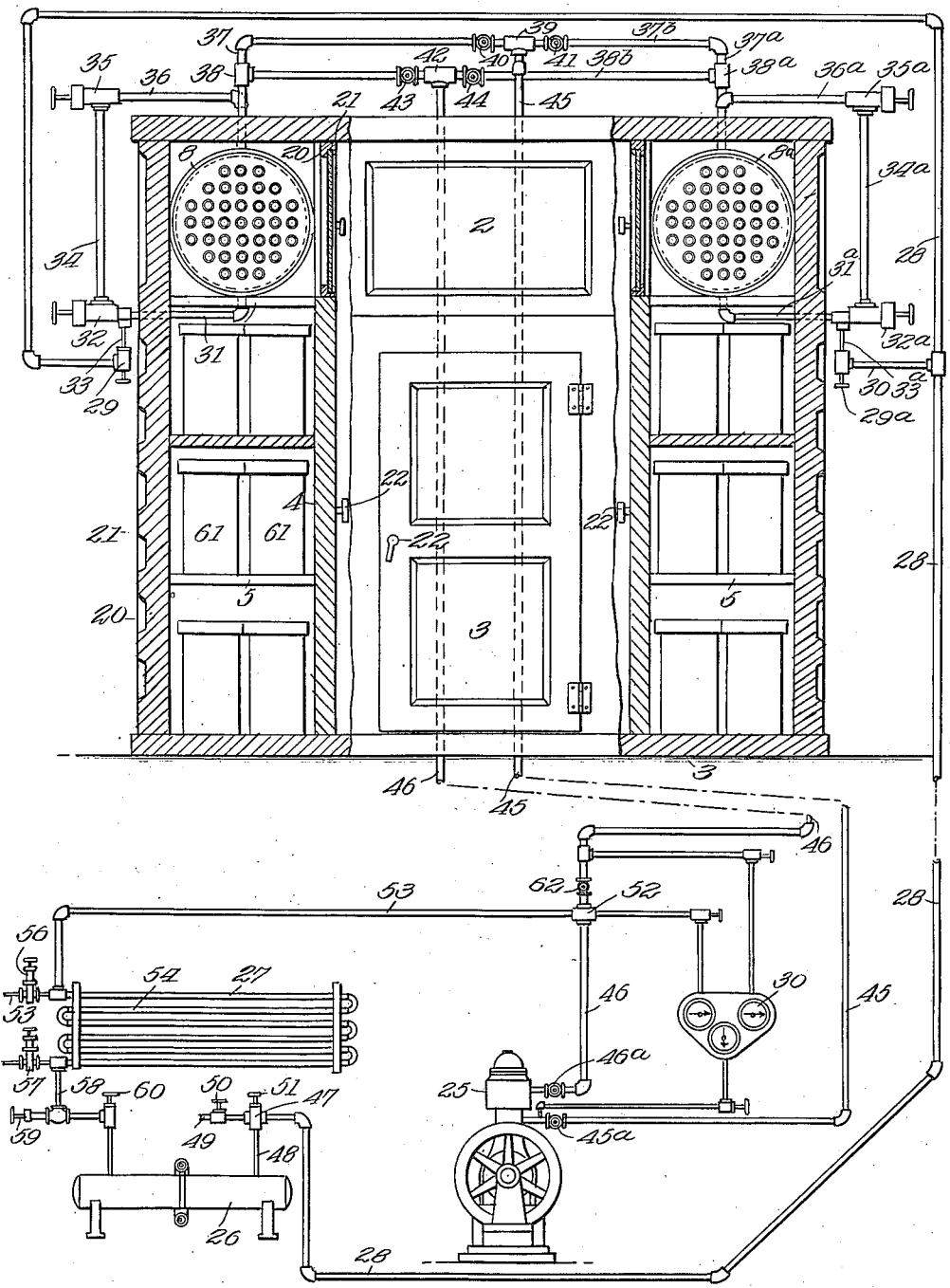

J. J. SCHRADE.
REFRIGERATING MACHINE.
APPLICATION FILED DEC. 11, 1912.
1,075,126.
Patented Oct. 7, 1913.
2 SHEETS—SHEET 1.
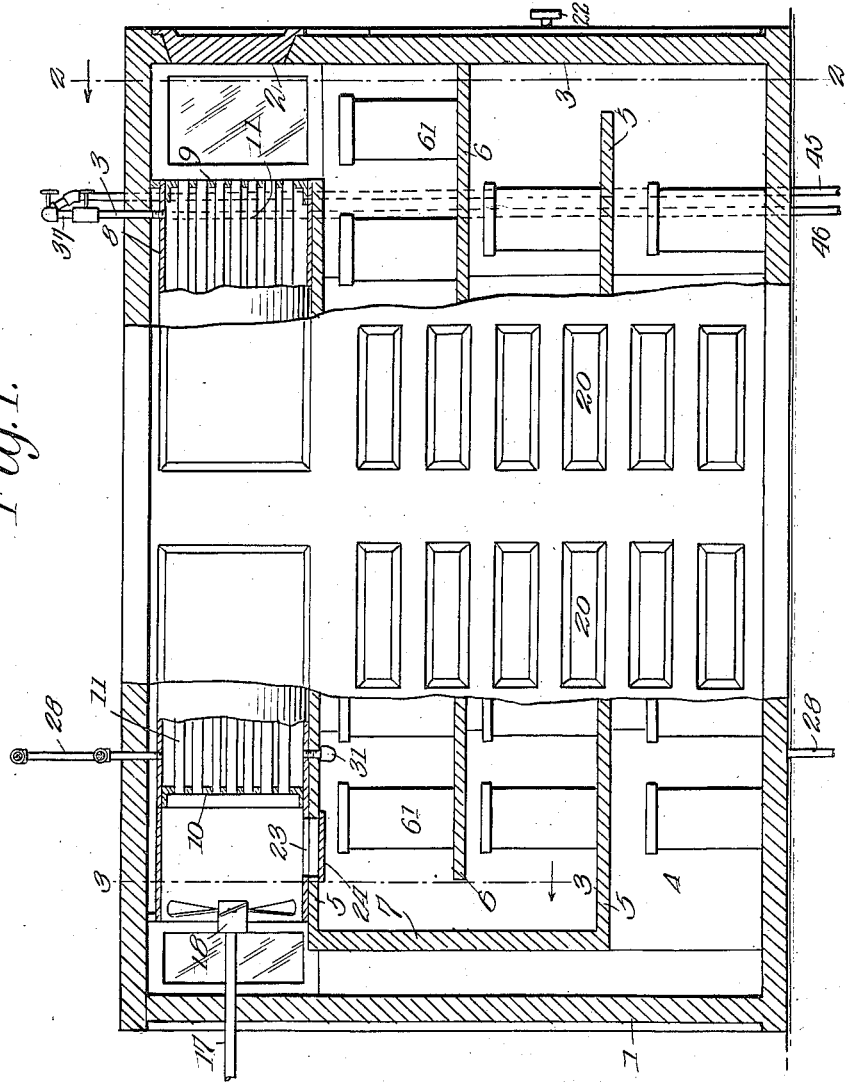
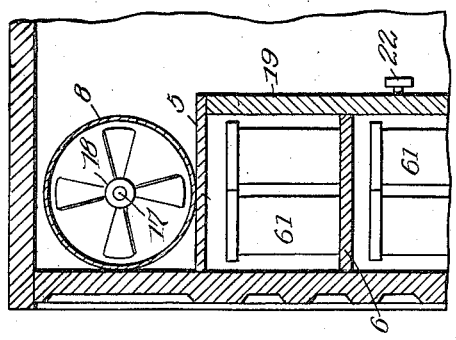
WITNESSES
S. E. Wade
C. E. Trainer
INVENTOR
JOHN JACOB SCHRADE
BY Munn & Co.
ATTORNEYS

J. J. SCHRADE.
REFRIGERATING MACHINE.
APPLICATION FILED DEC. 11, 1912.

1,075,126.

Patented Oct. 7, 1913.
2 SHEETS—SHEET 2.

WITNESSES
S. E. Wade.
C. E. Tranter

INVENTOR
JOHN JACOB SCHRADE,
BY Munn & Co.
ATTORNEYS

UNITED STATES PATENT OFFICE.

JOHN JACOB SCHRADE, OF WACO, TEXAS.

REFRIGERATING-MACHINE.

1,075,126.

Specification of Letters Patent.  Patented Oct. 7, 1913.

Application filed December 11, 1912.  Serial No. 736,173.

*To all whom it may concern:*

Be it known that I, JOHN JACOB SCHRADE, a citizen of the United States, and a resident of Waco, in the county of McClellan and State of Texas, have invented certain new and useful Improvements in Refrigerating-Machines, of which the following is a specification.

My invention is an improvement in refrigerating machines, and has for its object the provision of a simple device of the character specified, adapted to be operated in connection with an ice making machine, wherein the device is cooled by air circulation, the air being cooled during its circulation.

In the drawings:—Figure 1 is a side view of the improved machine, partly in section, and Figs. 2 and 3 are sections on the lines 2—2 and 3—3 respectively of Fig. 1.

The present embodiment of the invention comprises a casing 1 of suitable size, having at one end, the front, a plurality of doors 2 and 3. The casing is separated into a central compartment, and two lateral compartments by means of vertically arranged partitions 4, and each of the lateral compartments is further subdivided by horizontal partitions 5 and 6. The partition 6 in each lateral compartment is at the center, and the end of the partition adjacent to the doors 2 and 3 is in contact with the end wall of the casing. The opposite end of each of the said partitions is spaced apart from the opposite end wall as shown in Fig. 1. The partitions 5 are arranged half way between the partition 6 and the top and bottom respectively of the casing, and the ends of the partitions remote from the doors 2 and 3 in each compartment are connected by a vertical plate or partition 7, extending the full width of the compartment. The opposite ends of the partitions 5 are spaced from the end wall of the casing, and partition 6 is spaced from the wall 7. The partitions 5, 6 and 7 act thus as baffle plates, to constrain air to circulate backward and forward in the lateral compartment. The central compartment extends the full depth of the casing, and the doors 2 and 3 open into the said compartment. Cylindrical casings 8 and 8ᵃ are arranged in the respective lateral compartments, at the top thereof, each resting on the upper partition 5. Each casing 8 and 8ᵃ is provided with a head 9 at its front end, and with a diaphragm 10 near the opposite end, and a plurality of pipes or flues 11, extend from the head to the diaphragm, opening through both, and the ends of the casings 8 and 8ᵃ are spaced apart from the ends of the casing 1. A shaft 17 is journaled coaxial with each of the casings 8 and 8ᵃ at the end adjacent to the diaphragm 10, and a fan 18 is secured to each shaft within the casing. Each of the said shafts extends outside of the casing, as shown in Fig. 1, and may be connected with a suitable source of power for turning the same.

It will be noticed that the partitions 4 do not extend higher than the uppermost horizontal partition 5, and doors 19 are provided in the said partitions, for permitting access from the central compartment to the lateral compartment. At each end of the casing 8 and 8ᵃ, a door is arranged between the lateral compartment within which the casing 8 and 8ᵃ is arranged, and the central compartment, each of the said doors consisting of a frame 20, and a panel 21 of transparent material, as for instance glass. When the said doors are open, the ends of the compartments in which the casings 8 and 8ᵃ are arranged are placed in communication with the central compartment. Each of the doors 2, 3, 19 and 20—21 is provided with a suitable latch mechanism 22 and an opening 23 is provided in each casing 8 and 8ᵃ between the fan and the diaphragm 10. Each of the said openings 23 registers with an opening in the partition 5, and a closure 24 is provided for closing the registering openings. The fans 18 when in operation, force a current of air through the flue pipes 11 in the casings 8 and 8ᵃ, and the said current circulates on each side of the casing 1 as follows: The air passes through the flues and casing 8 and 8ᵃ, to the front end of upper partition 5. From thence the air passes below the partition to the rear end of partition 6, and is caused by plate 7 to again pass forwardly to the front end of lower partition 5. The air passes then below the lower partitions 5, and upwardly between the rear end of the casing and plate 7 to the fan. A continuous circulation of air is thus provided for in the two lateral compartments. The cylindrical casing 8 and 8ᵃ at each side is partially filled with liquid ammonia, and the air passing through the flues gives up its heat to the ammonia, thus thoroughly refrigerating the air.

In Fig. 2 is shown diagrammatically the refrigerating machine 25. A liquid receiver 26 is arranged adjacent to the said machine, and a condenser 27 is arranged adjacent to the receiver. A pipe line 28 leads from one end of the receiver 26 to the casing 1, and the opposite end of said pipe from the receiver is connected to a valve casing 29 at one side of the refrigerating case. A branch pipe 30 leads from the said pipe 28 to a similar valve casing $29^a$ at the opposite side of the casing 1. Each of the said valve casings 29 and $29^a$ is connected to a pipe 31—$31^a$, respectively, leading from the bottom of the adjacent cylindrical casing 8 and $8^a$. Each of the said pipes 31—$31^a$ passes downwardly through the adjacent partition 5 and outwardly, to a connection with a valve casing 32—$32^a$, respectively, and a short section of pipe 33—$33^a$ connects the valve casing 29—$29^a$ with the pipe 31 or $31^a$, at a point adjacent to the said casing 32 or $32^a$. Glass pipes 34 and $34^a$ extend upwardly from the respective casings 32 and $32^a$, to connections with valve casings 35—$35^a$ at the outer ends of pipes 36 and $36^a$. The inner ends of the said pipes 36 and $36^a$ are connected with the casings 8 and $8^a$ at the upper side thereof, as shown more particularly in Fig. 2. A pipe 37—$37^a$ is connected with each casing 8 and $8^a$ at the upper side thereof, and the upper ends of the said pipes 37—$37^a$ are connected by a horizontal pipe $37^b$. A T 38—$38^a$ is interposed in each pipe 37—$37^a$, near its upper end, and a horizontal pipe $38^b$ connects the said T's. A T casing 39 is interposed in the pipe $37^b$, and valve casings 40 and 41 are arranged in the said pipe on each side of the T. A similar T 42 is interposed in the pipe $38^b$, and valve casings 43 and 44 are arranged in the said pipe on each side of the T. A vertical pipe 45 leads downwardly from the T 39, and a similar pipe 46 leads downwardly from the T 42. The pipe 45 is the suction pipe, and the pipe 46 is the discharge pipe for the machine 25. Valve casings $45^a$ and $46^a$ are interposed in the said pipes adjacent to the machine. The pipe 28 at the end adjacent to the reservoir, is connected to a cross valve casing 47. A vertical pipe 48 leads from the cross to the reservoir, and a pipe 49 leads laterally from the cross in the opposite direction to the pipe 28. The pipe 28 is the charging pipe, and a valve 50 is provided for controlling the same adjacent to the cross. A valve 51 is arranged in the cross, by means of which the pipe 49 may be connected directly with the pipe 28, or either pipe may be connected through pipe 48 to the reservoir.

In operation, anhydrous ammonia is the refrigerant. A vacuum is first produced in the system, after which ammonia passes in through the charging valve 50 and through the valve 51 in a liquid form and under high pressure. On account of the pressure of the ammonia and the suction produced by the partial vacuum in the machine, liquid ammonia passes through the pipe 28 and valves 29 and $29^a$ into the cylinders, until each is about half full of liquid ammonia. The refrigerating machine is constantly pumping the gas from the ammonia as fast as it is formed in the cylinders, through the suction line 45 and valves 40 and 41 to the machine. To produce the low temperature required, a pressure below atmosphere or about five inches above is maintained in each of the cylinders, and has the effect of permitting the ammonia to absorb heat having extremely low temperature.

The refrigerating machine is really a pump, designed especially for the purpose stated and pumps the gases from the cylinder into the machine. These gases contain heat and as the gases are compressed, the heat is discharged from the machine at a high temperature to the condensers.

It will be evident that any kind of condenser may be used, that shown being used merely for convenience. The water pipe on the inside of the ammonia pipe cools the hot gaseous ammonia and condenses it to liquid form and the liquid settles by gravity into the receiver 26. As the machine operates continuously, keeping the pressure at the required point in the cylinders, the cycle of operation is continuous, the ammonia absorbing the heat from the vault or casing, and the cool water is absorbing the heat from the gaseous ammonia in the condenser, returning it in liquid form to continue its cycle of operation indefinitely. The greater the absorbing surface of a medium, the greater is its capacity. For this reason a cylindrical drum is used, filled with flues, in order that the greatest possible amount of heat may be absorbed from the air.

The device is especially adapted for retaining ice cream in frozen condition.

In the course of time, the flues of the cylinder become coated with frost and the outside of the cylinder also becomes coated until the absorbing capacity is retarded. It is then necessary to remove this frost and the following means is employed: Without stopping the operation of the machine, heated gas is admitted to one cylinder at a time as for instance, the cylinder at the left of Fig. 2. After the improved machine has been run for three or four days, the cylinders require cleaning from frost, for the cleaner the cylinder the cheaper the cost of the operation. To clear the cylinder 8 from frost the heated gas is admitted to the said cylinder by opening the valve 62 and the valve 43 and closing the valve 40. The valve 29 is also opened and the valve 51 is closed. The valve 43 is opened widely while the valve 62 is only partly opened. The hot gasses passing into the cylinder quickly force out the ammonia and as the ammonia passes out of the cylinder, the cylinder is filling with the hot gas, so that when all of the ammonia is out, the cylinder is free from frost. The amount of hot gases admitted to the cylinder 8 at the left of Fig. 2 is controlled by the valve 62 and is indicated by the pressure gage 30. The pressure in the cylinder being low and the hot gas pressure being high, the cylinder 8 is heated or warmed and the frost is melted off, while at the same time the liquid ammonia is forced out through the valve 29 into the cylinder 8$^a$ through the valve 29$^a$. The opening 23 permits the melted frost and ice to run away into a receptacle. It will be understood that the process will be reversed to free the other cylinder from frost.

The pipes 34 and 34$^a$ are of glass and are gages to show the height of the ammonia in the adjacent cylinder.

A cross 52 is interposed in pipe 46, and a pipe 53 leads from the cross to the condenser.

It will be noted that the condenser 27 consists of an outer pipe 54 in which the ammonia circulates, and an inner water pipe 55 through which water circulates. A valve 56 controls the outlet of the water pipe, and a valve 57 controls the inlet to the said pipe. At the lower end of the condenser, a vertical pipe 58 leads from the outer pipe to the reservoir. Valves 59 and 60 are interposed in said pipe and the said valves may be opened to permit the ammonia to flow into the reservoir. The ammonia comes from the machine through the pipe 53, and is cooled by water within the pipes containing the ammonia, and in liquid form passes to the reservoir.

The valves 29—29$^a$ are expansion valves, and the said valves control the pressure in the casings or cylinders 8 and 8$^a$. The cycle of operation is continuous, the ammonia taking up the heat in the flue pipes 11 and giving it up to the water in the pipe 55. The air is in constant circulation on account of the fans 18, and the cooled air passes into contact with the packages 61, arranged on the partitions 5 and 6, and designed to hold the material to be cooled, as for instance, ice cream.

I claim:—

1. A device of the character specified, comprising a casing, vertical partitions dividing the casing into a central and lateral compartments, horizontal partitions in each of the lateral compartments, the alternate partitions being spaced from each end of the casing, a vertical plate connecting the rear ends of the said partitions, the intermediate partition being spaced from the plate and connected to the front end of the casing, a cylinder in each lateral compartment above the uppermost partition, the vertical partitions extending only to the cylinders, a head in each of the cylinders at the front end, a diaphragm in each cylinder near the rear end thereof, a plurality of flue pipes in each cylinder extending through the head and diaphragm, and means for circulating a refrigerant through each cylinder around the pipes.

2. A device of the character specified, comprising a casing having a central and lateral compartment, a cylinder at the top of each lateral compartment, a head at the front end of each cylinder, a diaphragm near the opposite end, flue pipes in each cylinder extending through the head and diaphragm, a fan at the rear end of each cylinder, for delivering a blast through the cylinder, and means for circulating a refrigerating fluid through the cylinders around the flue pipes.

3. A device of the character specified, comprising a casing having a central and lateral compartment, a cylinder at the top of each lateral compartment, a head at the front end of each cylinder, a diaphragm near the opposite end, flue pipes in each cylinder extending through the head and diaphragm, a fan at the rear end of each cylinder, for delivering a blast through the cylinder, means for circulating a refrigerating fluid through the cylinders around the flue pipes, and baffle plates arranged in horizontal spaced relation below each cylinder for constraining the air to pass backward and forward in the compartment and to finally reach the fan.

4. A device of the character specified, comprising a casing having a central and lateral compartment, a cylinder at the top of each lateral compartment, a head at the front end of each cylinder, a diaphragm near the opposite end, flue pipes in each cylinder extending through the head and diaphragm, a fan at the rear end of each cylinder, for delivering a blast through the cylinder, means for circulating a refrigerating fluid through the cylinders around the flue pipes, and means for constraining the air from the fan to travel backward and forward in each lateral compartment.

5. A device of the character specified, comprising a casing having a central and lateral compartment, a cylinder at the top of each lateral compartment, a head at the front end of each cylinder, a diaphragm near the opposite end, flue pipes in each cylinder extending through the head and diaphragm, means for causing air to circulate through the flue pipes, and means for heating the cylinder.

6. A device of the character specified, comprising a casing, flue pipes extending longitudinally of the casing and opening through the ends thereof, a refrigerator chamber adjacent to the casing, said chamber communicating at each end with the adjacent ends of the flue pipes, and means for causing a circulation of air through the flue pipes and through the chamber in one direction.

JOHN JACOB SCHRADE.

Witnesses:
J. E. PHILLIPS,
C. DEAN FOOTE.